United States Patent [19]

Schaefer

[11] Patent Number: 4,891,930
[45] Date of Patent: Jan. 9, 1990

[54] APPARATUS AND PROCESS FOR APPLYING A COVER, TO A ROUND HAY BALE

[76] Inventor: Alan W. Schaefer, Box A, Bloomsdale, Mo. 63627

[21] Appl. No.: 177,169

[22] Filed: Apr. 4, 1988

[51] Int. Cl.$^4$ .............................................. B65B 11/04
[52] U.S. Cl. ...................................... 53/587; 53/211; 414/24.6
[58] Field of Search ................ 53/465, 399, 441, 211, 53/587, 588, 556; 414/24.6

[56] References Cited

U.S. PATENT DOCUMENTS

| | | | |
|---|---|---|---|
| 3,928,939 | 12/1975 | Edwards | 53/465 X |
| 4,077,179 | 3/1978 | Lancaster | 53/211 X |
| 4,084,707 | 4/1978 | McFarland | 53/587 |
| 4,204,377 | 5/1980 | Lancaster | 53/587 |
| 4,343,132 | 8/1982 | Lawless, Jr. | 53/465 X |
| 4,522,348 | 6/1985 | Strout | 53/587 |
| 4,606,172 | 8/1986 | Miller | 53/587 X |
| 4,630,986 | 12/1986 | Taylor | 414/24.6 |
| 4,662,151 | 5/1987 | Mathes | 53/587 |

FOREIGN PATENT DOCUMENTS

| | | | |
|---|---|---|---|
| 2705101 | 8/1978 | Fed. Rep. of Germany | 53/211 |
| 2836246 | 3/1980 | Fed. Rep. of Germany | 414/24.6 |
| 2513484 | 9/1981 | France | 414/24.6 |

*Primary Examiner*—John Sipos
*Attorney, Agent, or Firm*—Gravely, Lieder & Woodruff

[57] ABSTRACT

To protect a round bale of hay from moisture, the bale is engaged by a machine attached to the three point hitch of a conventional farm tractor and then elevated with the hitch. An impervious strip, which is supplied on a roll, is attached at its end to the bale near one end of the bale, and then the machine rotates the bale, causing the strip material to pay off of the roll and wrap around the bale. The roll, which is on a dispenser, is maneuvered along the bale such that the strip wraps spirally around the bale with some overlap between adjacent convolutions of the strip. This forms a sleeve-like cover around the bale for the entire length of the bale. The machine includes a frame which connects to the three point hitch of the tractor and has a horizontal bearing in which a spear shaft rotates. The shaft is quite long and solid, so that as it rotates it may be driven into the bale from one end of the bale. Thus, when the three point hitch elevates the frame, the bale, which is impaled on the frame, rises off of the ground. The spear shaft is connected through a sprocket and chain drive to a power take off on the tractor, so that when the power take off is energized, the spear shaft rotates. The spear shaft carries a disk having spikes which project generally axially from it into the end of the bale. Thus the rotation of the spear shaft and disk is imparted to the bale. The machine may be provided with a track which supports a carriage to which the dispenser is attached, thus guiding the roll along the side of the bale as the strip pays off of the roll.

3 Claims, 5 Drawing Sheets

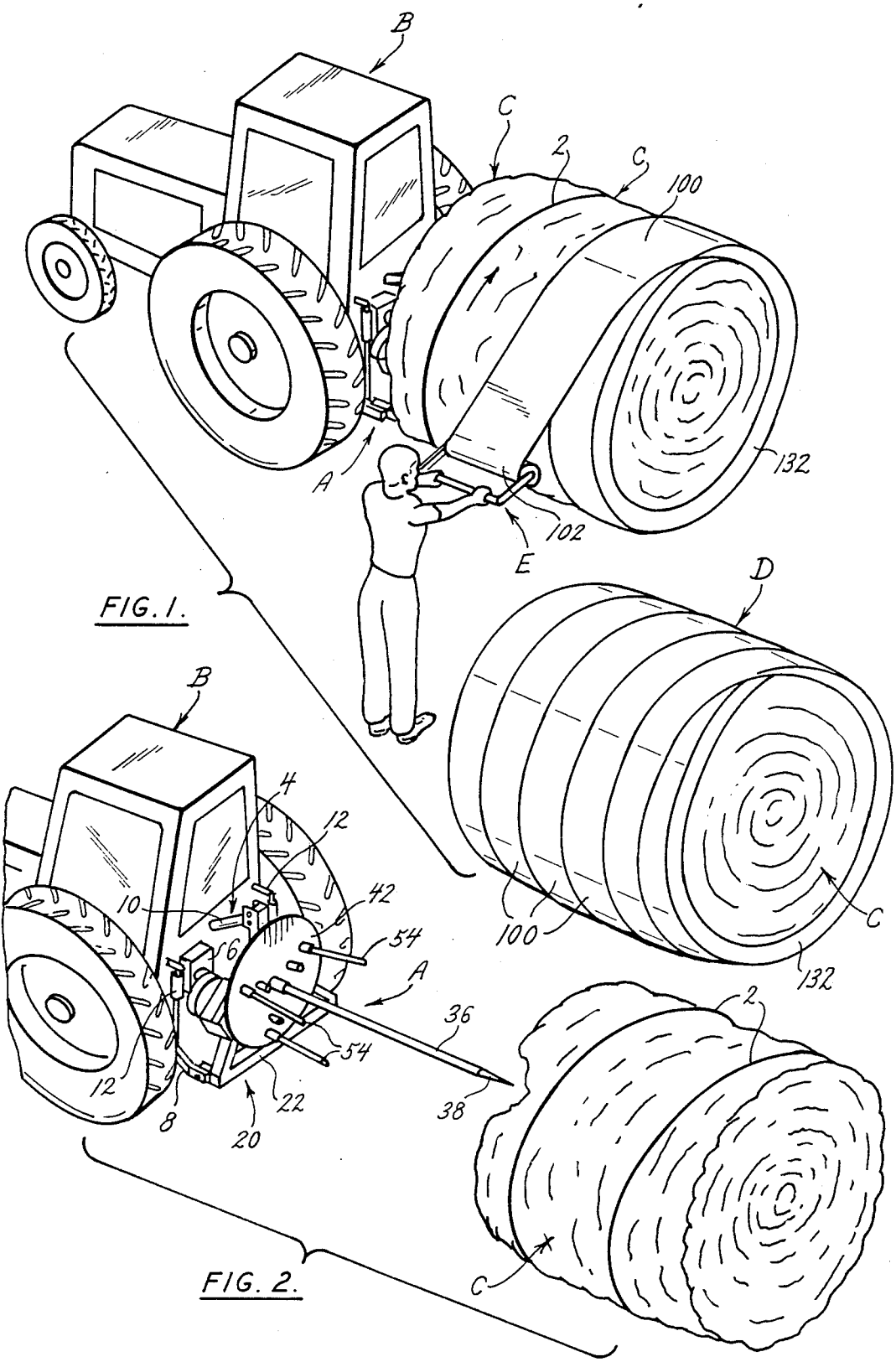

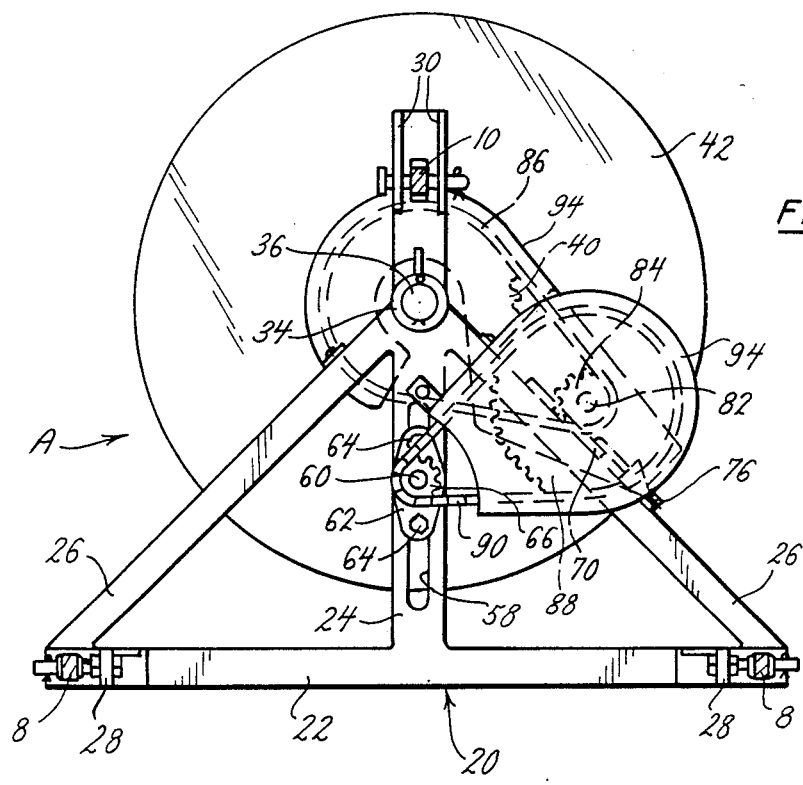
FIG. 4.
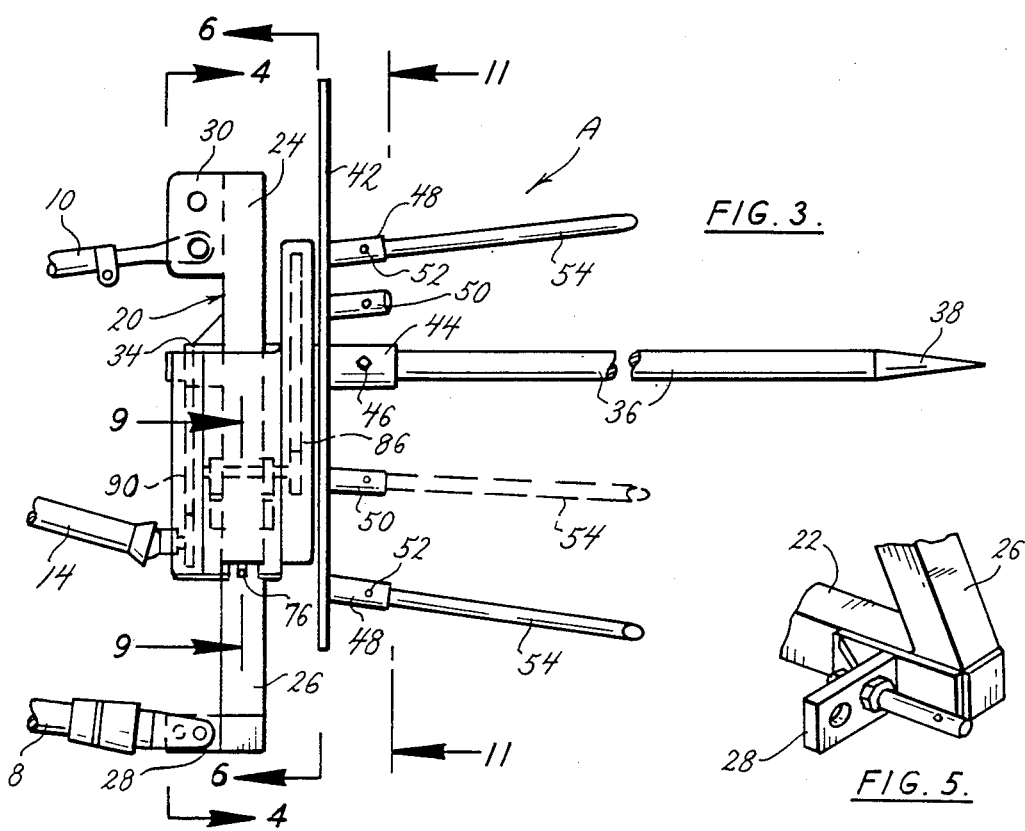
FIG. 3.
FIG. 5.

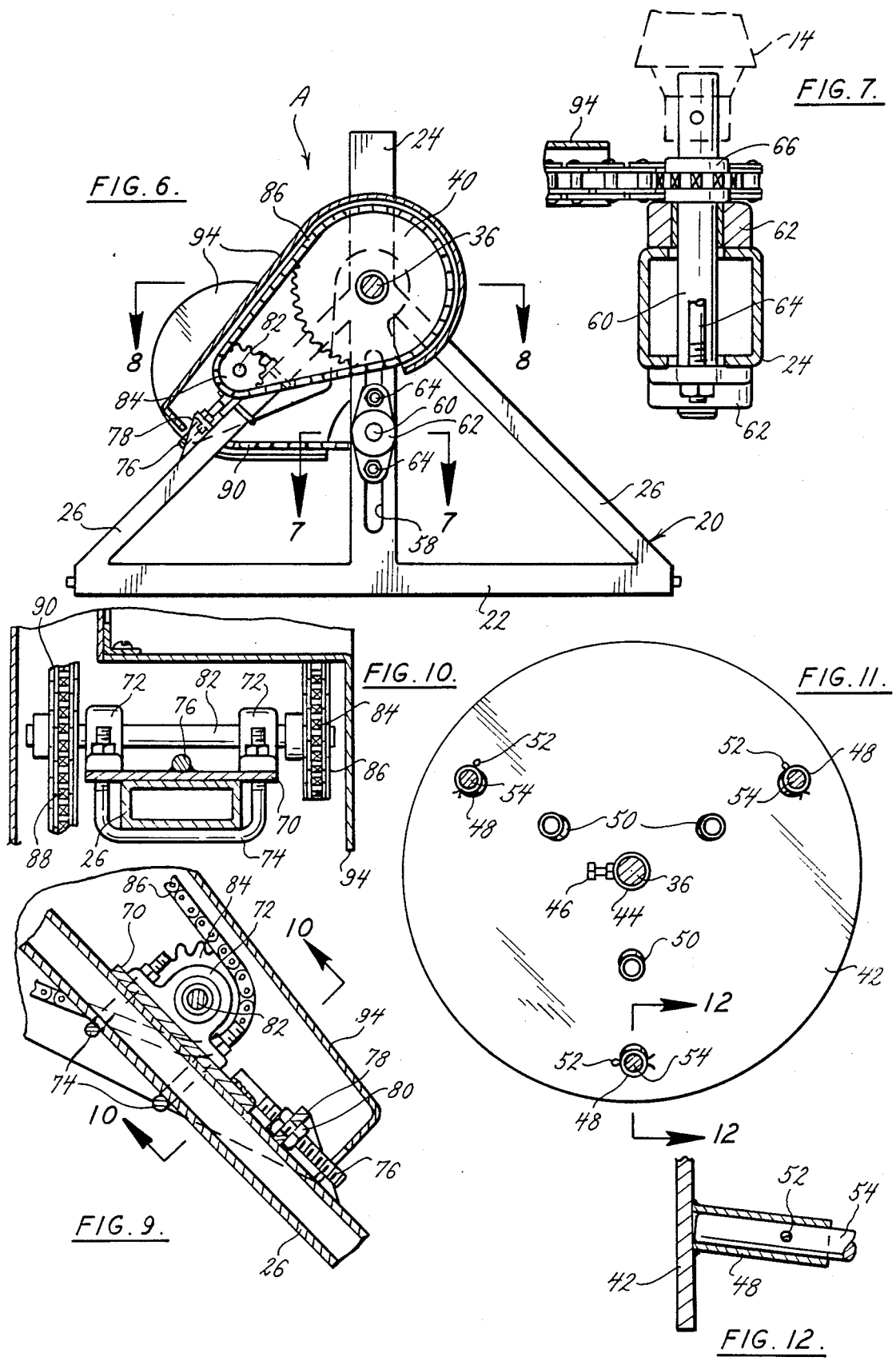

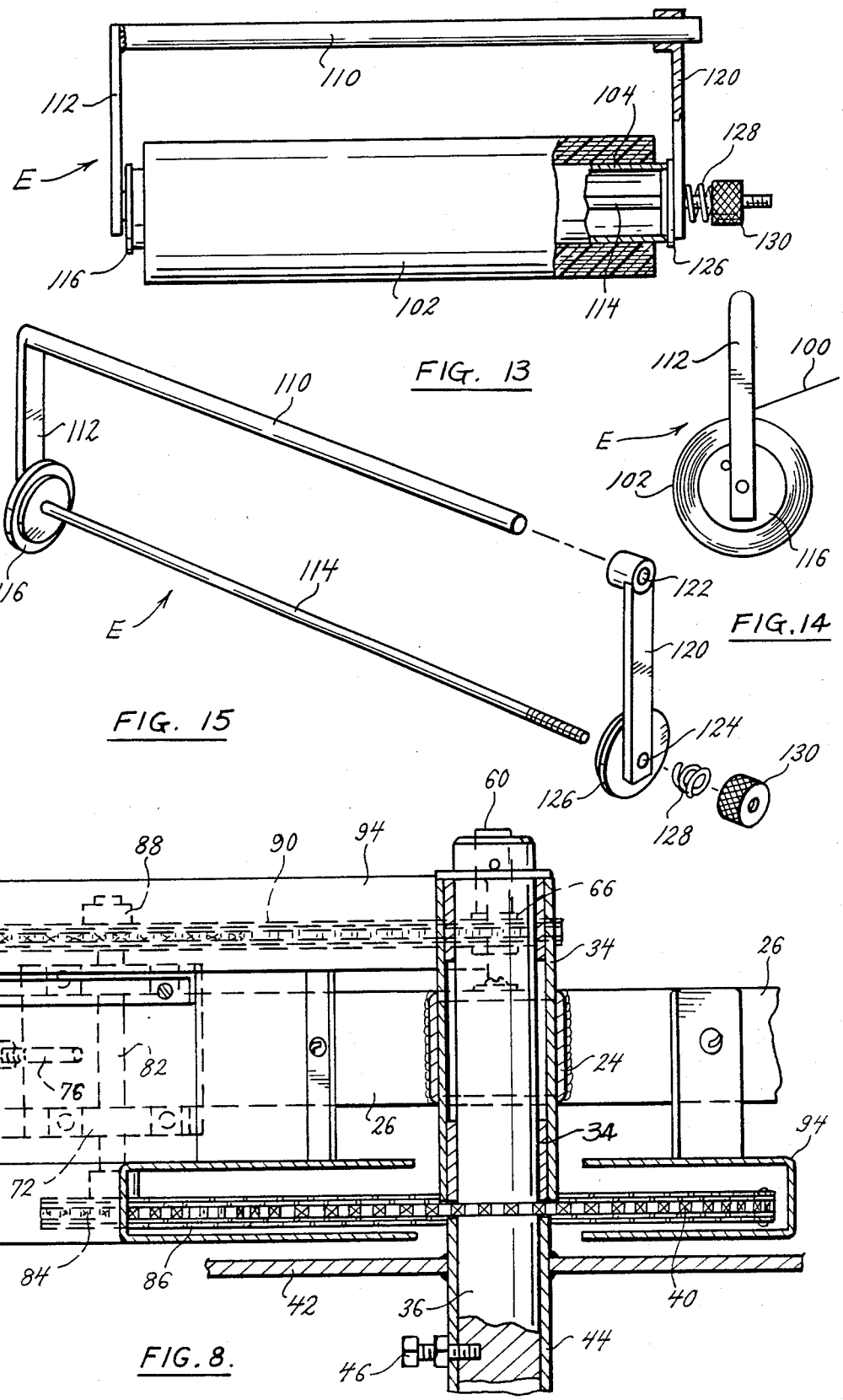

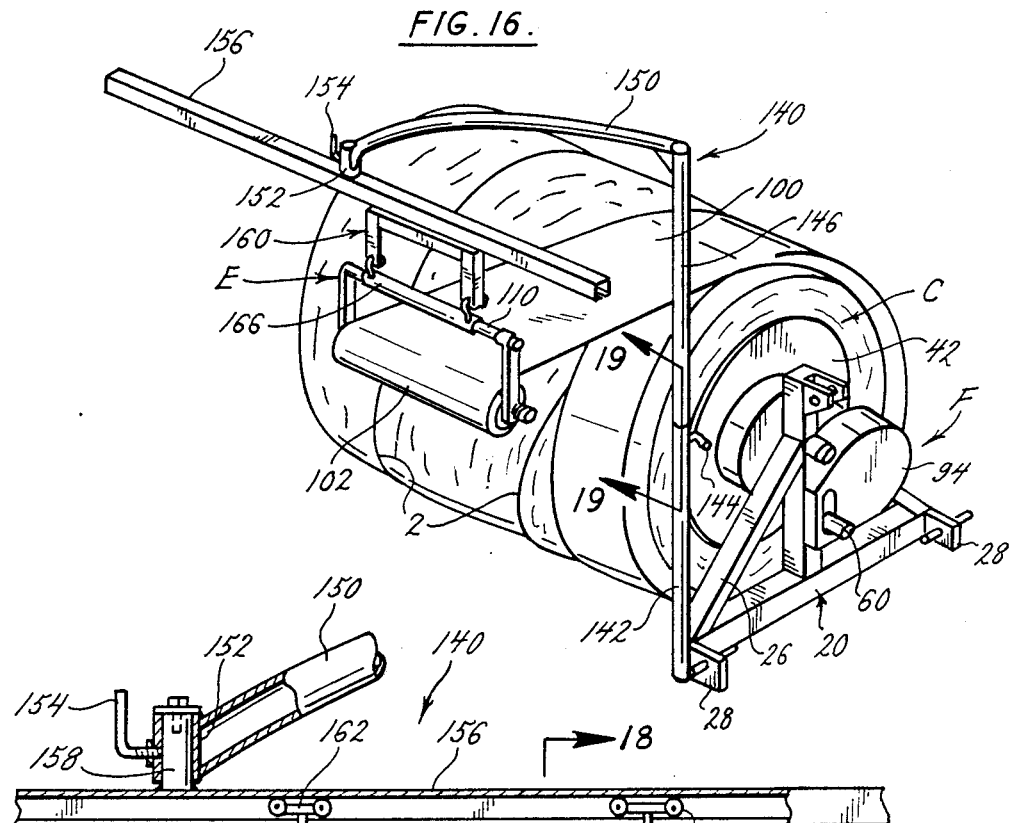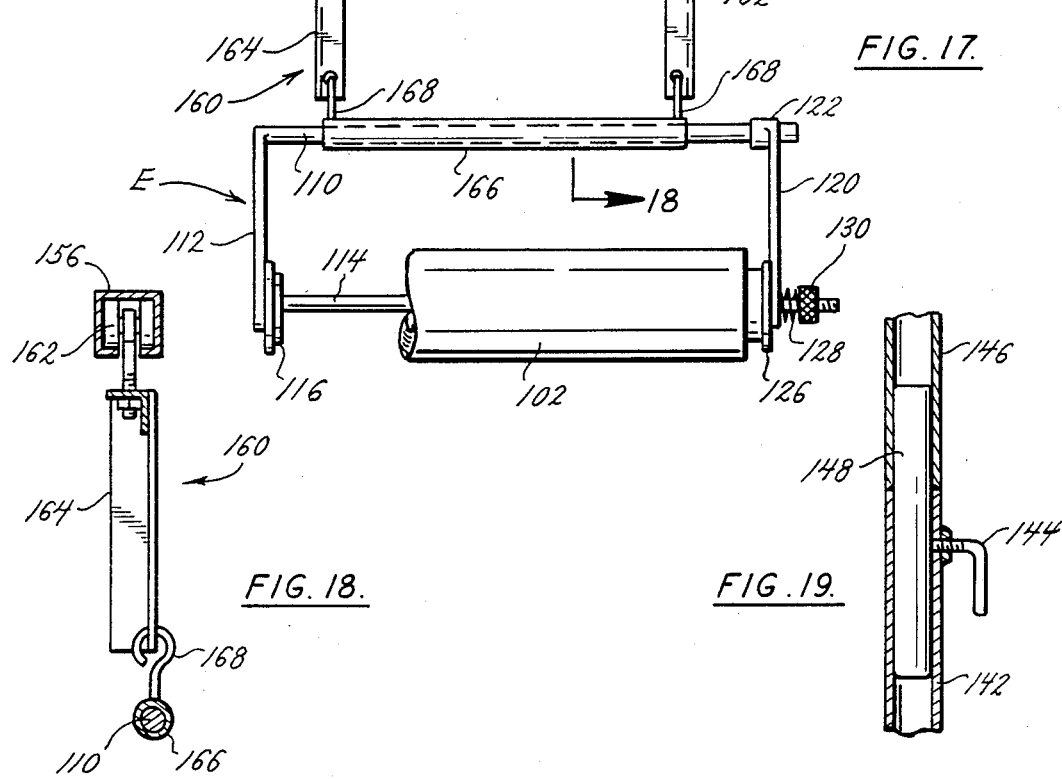

APPARATUS AND PROCESS FOR APPLYING A COVER, TO A ROUND HAY BALE

BACKGROUND OF THE INVENTION

This invention relates in general to fodder, and more particularly to an apparatus and process for protecting hay when it is stored outdoors.

Farmers plant and harvest hay primarily as a source of fodder for their cattle during the winter months when cattle have little or no grass upon which to graze. The hay loft of the traditional barn has served as a storage area for much of this hay, protecting it from the elements which might have otherwise caused the hay to rot and disintegrate. Harvesting machinery accommodated this end by providing relatively small rectangular bales which weighed no more than about 50 lbs. each. A single individual could easily handle such a bale, while a simple conveyor was all that was necessary to elevate it to a hay loft.

The traditional rectangular bale has to a measure given way to large cylindrical bales measuring about 6 ft. in diameter and weighing in excess of 1000 lbs. These bales, which are produced on special harvesting machines, are much too large to be stored in barns, much less lifted into hay lofts. To move a large cylindrical bale requires a tractor equipped with a special fork which penetrates the bale from its end. These tractors usually move such bales to the edges of the fields in which their hay is grown or to nearby pastures, but rarely are the bales placed under a protective cover.

Indeed, the typical cylindrical bales remain exposed to the elements while they await use as fodder. Rain and snow penetrate these bales, and in time the hay within them becomes moldy and rots, particularly immediately beneath the outer layer of hay. Moldy and rotten hay can be toxic to cattle. Thus, by the end of winter and the following spring much of the hay which is stored outdoors is unfit for consumption by cattle, but this is the time when many cows give birth and should have the highest quality fodder.

Covers large enough to extend over the tops of cylindrical hay bales are currently available on the market, but these covers do not protect the full sides of the bales, nor do they prevent water from soaking up from the ground. U.S. Pat. No. 4,248,343 shows such a cover.

A need exists for a cover which extends completely around a large cylindrical bale, as well as for a machine and process for installing such a cover. The present invention concerns such a machine and process.

DESCRIPTION OF THE DRAWINGS

In the accompanying drawings which form part of the specification and wherein like numerals and letters refer to like parts wherever they occur FIG. 1 is a perspective view showing a cylindrical hay bale provided with a cover formed in accordance with the present invention and in addition showing a tractor provided with a machine constructed in accordance with the present invention for supporting a hay bale so that a strip of water-impervious material may be applied to it from a dispenser as the material rotates the bale;

FIG. 2 is a perspective view showing the machine on the tractor aligned with the end of the cylindrical bale for insertion of the spear shaft on the machine into the bale;

FIG. 3 is a side elevational view of the machine for supporting and rotating the cylindrical bale of hay;

FIG. 4 is an end elevational view of the machine taken along line 4—4 of FIG. 3;

FIG. 5 is a fragmentary perspective view showing one of the brackets for attaching the machine to the three-point hitch of a tractor;

FIG. 6 is a sectional view of the machine taken along line 6—6 of FIG. 3;

FIG. 7 is a fragmentary sectional view of the machine taken along line 7—7 of FIG. 6;

FIG. 8 is a fragmentary sectional view of the machine taken along line 8—8 of FIG. 6;

FIG. 9 is a fragmentary sectional view of the machine taken along line 9—9 of FIG. 8;

FIG. 10 is a fragmentary sectional view of the machine taken along line 10—10 of FIG. 9;

FIG. 11 is a sectional view taken along line 11—11 of FIG. 3 and showing the backing disk of a machine;

FIG. 12 is a sectional view taken along line 12—12 of FIG. 11 and showing one of the sockets for the drive spikes of the machine;

FIG. 13 is a front elevational view, partially broken away and in section, of the dispenser for applying an impervious film-like material to the bale as the bale is rotated by the machine;

FIG. 14 is an end elevational view of the dispenser;

FIG. 15 is an exploded perspective view of the dispenser;

FIG. 16 is a perspective view of a modified machine having a film dispenser incorporated into it;

FIG. 17 is a side elevational view of the dispenser on the modified machine;

FIG. 18 is a sectional view taken along line 18—18 of FIG. 17; and

FIG. 19 is a sectional view taken along line 19—19 of FIG. 16.

DETAILED DESCRIPTION

Referring now to the drawings (FIGS. 1 & 2), a machine A, which is attached to a tractor B, holds and rotates a large cylindrical bale C of hay while a cover D is applied to it. The cover D, which is a flexible film derived from a dispenser E, extends completely around the cylindrical surface of the bale C, covering it completely much like a sleeve, which in fact it is, and thus prevents moisture from seeping into the bale C along its upwardly presented surface, or soaking into the bale C from the ground. The bale C itself consists of nothing more than hay wound into a cylindrical configuration having a diameter of about 5 to 6 ft. and a length about the same. In addition, the bale C has twine 2 which loops around its cylindrical surface several times and prevents the hay from unraveling.

The tractor B on which the machine A is mounted has a three point hitch 4 (FIG. 2) as well as a power take off 6, both of which are appliances common to American farm tractors. The three point hitch 4 includes two struts 8 and a single tie rod 10, each of which attaches to the frame of the tractor B such that it may swing or pivot upwardly and downwardly. The three project rearwardly from the space between the rear wheels of the tractor B, with the tie rod 10 being located above and centered with respect to the two struts 8, which themselves are at the same elevation on the tractor frame. The length of the tie rod 10 is easily altered. The two struts 8 and the tie rod 10 at their rearwardly presented ends are attached to the machine A, again such that the three may pivot upwardly and downwardly with respect to the machine A. This arrangement permits the elevation of the machine A to be changed, and this change is achieved with an elevating mechanism 12 which is attached to the struts 8 of the hitch 4 and is itself part of the hitch 4. The power take off 6 on the tractor B is connected to the machine A through a drive shaft 14 which telescopes to accommodate changes in the elevation of the machine A.

The machine A includes a frame 20 (FIGS. 3, 4 & 6) formed from tubular steel in a generally triangular shape, in that it has a base member 22, an upright member 24 which extends upwardly from the base member 22 midway between the ends of the base member 22, and side members 26 which extend obliquely between the ends of the base member 20 and the upright member 24, intersecting the latter somewhat below its upper end. All of the members 22, 24 and 26 are welded firmly together to provide the frame 20 with substantial rigidity. At its ends, the base member 22 is provided with connecting brackets 28 (FIG. 5) having pins to which the struts 8 are attached. The upright member 24 at its upper end has a clevis 30 (FIGS. 3 & 4) into which the end of the tie rod 10 extends, it being connected to the clevis 30 by another pin. Thus, the pins in the brackets 28 and in the clevis 30 permit the frame 20 to pivot relative to the struts 8 and tie rod 10 of the three point hitch 4 as the elevating mechanism 12 alters the elevation of the frame 20. The length of the tie rod 10 determines the inclination of the frame 20, and that length may be adjusted, and indeed it should be, to place the frame 20 in a generally vertical orientation, that is to say, with the upright member 22 of the frame 20 presented vertically.

In the region where the oblique side member 26 joins the upright member 24, the upright member 24 is fitted with a sleeve bearing 34 (FIGS. 4 & 8) which projects forwardly and rearwardly from the upright member 24 with its axis being perpendicular to the plane of the frame 20. The bearing 34 contains bronze inserts to which grease may be directed from time to time, and the inserts receive a spear shaft 36 of substantial length, perhaps 5 to 6 ft., and of substantial diameter on the order of 2 in. The shaft 36 extends completely through the bearing 34, it being fitted at its one end with a washer and roller pin to prevent it from moving out of the bearing 34. The shaft 36 at its opposite end is turned down to a conical point 38 (FIG. 3). Immediately beyond the bearing 34, that is to the rear of it, using the tractor as the source of orientation, the shaft 36 is fitted with a sprocket 40 which rotates adjacent to the frame 20 when the shaft 36 turns in its bearing 34.

The spear shaft 36 carries a circular backing disk 42 (FIGS. 3, 8 & 11) which is welded to a central sleeve 44 that fits over the shaft 36, the sleeve 44 being secured firmly to the shaft 36 by a set screw 46 which passes into the shaft 36. While the sprocket 40 fits around the shaft 36 adjacent the bearing 34, it also fits around the sleeve 44 and is indeed welded to the sleeve 44. The disk 42 measures about 30 inches in diameter, and it lies in a plane perpendicular to the axis of the spear shaft 36. Attached to the rearwardly presented face of the disk 42 are three outer mounting sockets 48 and three inner mounting sockets 50. Each socket 48 and 50 also accommodates a cotter pin 52. The outer sockets 48 are arranged at 120° intervals as are the inner sockets 50, but the former are located near the periphery of the disk 42 and have their axes slightly divergent with respect to the axis of rotation, while the latter are set inwardly closer to the central sleeve 44 and have their axes parallel to the axis of rotation. The sockets 48 and 50 receive short drive spikes 54, the free ends of which are beveled or pointed to facilitate advancement into a bale C. Only three drive spikes 54 exist, but they can be transferred between the outer and inner sockets 48 and 50, and in either are held in place by the cotter pins 52.

The spear shaft 36 is designed to penetrate the bale C at the center or axis of the bale C and to advance far enough to enable the drive spikes 54 to likewise penetrate the bale C, although further from its axis (FIG. 1). The backing disk 42 prevents the bale C from becoming entangled in the sprocket 40 or the frame 20.

Below the sleeve bearing 34 the upright member 24 of frame 20 is provided with a slot 58 through which a driven shaft 60 extends, the shaft 60 being received in bearings 62 which are clamped against the member 24 by tie bolts 64 that extend through the slot 58 (FIGS. 4, 6 & 7). When the bolts 64 are loosened, the bearings 62 and the shaft 60 may be moved upwardly and downwardly, with the slot 58 accommodating the movement. Opposite that bearing 62 which is presented toward the tractor B, the shaft 60 is fitted with a small sprocket 66, and at its other end it is provided with a washer and pin to prevent the shaft 60 from moving axially out of the bearings 62. The shaft 60 projects forwardly beyond the sprocket 66, and here it is coupled to the drive shaft 14 that is connected to the power take off 6 of the tractor B. Thus, the driven shaft 60 rotates at the angular velocity of the power take off 6.

One of the side members 26 of the frame 20 carries a plate 70 to which a pair of bearings 72 are attached (FIGS. 9 & 10). The plate 70 is secured to the side member 26 by U-bolts 74 which fit around the side member 26. Normally the bolts 74 are turned down tightly against the plate 70, and this secures the plate 70 and bearings 72 firmly in position on the frame 20, but when the bolts 74 are backed off slightly, the plate 70 is released to move longitudinally along the side member 26. Indeed, the plate 70 has a threaded rod 76 extended from it along the side member 26, and the rod 76 passes through a bracket 78 on the side member 26, beyond which a nut 80 threads over the rod 76. By turning the nut 80 down against the bracket 78, the nut 80 draws the plate 70 and its bearings 72 downwardly away from both the sleeve bearing 34 and bearings 62, assuming of course that the U-bolts 74 which extend through the plate 70 are loose. Within the bearings 72 an idler shaft 82 rotates. Beyond one of its bearings 72 the idler shaft 82 is fitted with a small sprocket 84 which aligns with the larger sprocket 40 on the sleeve 44 of the spear shaft 36, and indeed a roller chain 86 passes around the two sprockets 40 and 84 so that when the shaft 82 rotates, the spear shaft 36 likewise rotates, although at a lesser velocity (FIG. 5). Beyond the other of its bearings 72 the idler shaft 82 is fitted with a large sprocket 88 which aligns with the small sprocket 66 on the driven shaft 60, and extended around the two sprockets 66 and 88 is another roller chain 90 (FIG. 4). Thus, when the power take off 6 rotates the driven shaft 60, the idler shaft 82 turns and so does the spear shaft 36, inasmuch as all three shafts 36, 60 and 82 are connected through the roller chains 86 and 90. The slack in the two chains 86 and 90 is controlled by the adjustments previously described for the shafts 82 and 86.

The two chains 86 and 90, their respective sprockets 40, 86 and 66, 90 along with the idler shaft 82 are enclosed in sheet metal closures 94 (FIGS. 4 & 5) which are attached to the frame 20, but may be removed for repairs and adjustments to the components normally shielded by them.

The machine A supports and rotates a bale C of hay while the film-type cover D is installed around the cylindrical surface of the bale C. But before the cover D can be applied to the bale C, the bale C must first be elevated with the machine A. To this end, the tractor B with the machine A mounted on its three point hitch 4 is maneuvered to present the machine A toward and to center it with one end of the bale C (FIG. 2). The elevating mechanism 12 on the tractor B is operated to move the frame 20 upwardly or downwardly until the conical point 38 on the spear shaft 36 generally aligns with the center or cylindrical axis of the bale C. After taking care that the drive spikes 54 are in the outer sockets 48, the operator backs the tractor B toward the end of the bale C, whereupon the conical point 38 of the spear shaft 36 enters the bale C. The shaft 36 thereupon advances into the bale C under the force exerted by the tractor B, and to facilitate the penetration, the power take off 6 is energized to rotate the spear shaft 34. In time the ends of the drive spikes 54 reach the end of the bale C, whereupon the advancement continues, but without rotation of the spear shaft 36. The drive spikes 54 likewise enter the bale C. The tractor B continues rearwardly until the backing disk 42 comes against or near to the end of the bale C (FIG. 1).

Once the spear shaft 36 is fully inserted into the bale C, the elevating mechanism 12 of the three point hitch 4 is energized to swing the struts 8 and tie rod 10 upwardly, and this of course elevates the machine A and the bale C which is impaled on the spear shaft 36 of the machine A. The bale C is elevated enough to bring its downwardly presented surface about 1 ft. above the ground.

The cover D constitutes a strip 100 of cling-type polymer film, such as polyethylene, which is wound spirally around the cylindrical surface of the bale C as well as lapped inwardly about 6 in. over the ends of the bale C. Typically, the strip is about 26 ½ in. wide and is placed such that an overlap of about 3 in. exists at adjacent convolutions. The film has cling characteristics along with the capacity to stretch, and is further treated to retard degradation by ultraviolet radiation.

The strip 100 of film derives from a roll 102 which is carried on the film dispenser E (FIGS. 13 & 14). The roll 102 has a hollow core 104 around which the strip 100 is wound. Indeed, the strip 100 pays off of the roll 102 as the strip 100 is wound spirally around the bale C.

The dispenser E includes a handle 110 to which an end bracket 112 is attached, and the bracket 112 in turn is fitted with a spindle 114 which projects from it parallel to the handle 110, with the spacing between the handle 110 and spindle 114 being somewhat greater than the minimum radius of the roll 102 (FIGS. 13-15). The end bracket 112 is further provided with a smooth friction disk 116 at the end of the spindle 114, and this disk is slightly larger in diameter than the core 104 of the roll 102. The handle 110, bracket 112, spindle 114 and disk 116, all constitute a single unit, and thus the bracket 112 is fixed in position with respect to the other components of that unit.

At their other ends the handle 110 and spindle 114 are fitted with a removable end bracket 120. To this end the bracket 120 is provided with a large bore 122 into which the end of the handle 110 fits and a smaller bore 124 which receives the threaded end of the spindle 114. Around the smaller bore 124 the bracket 120 has a smooth friction disk 126 which is equivalent in size to the other friction disk 116.

With the removable bracket 120 detached from both the handle 110 and the spindle 114, the spindle 114 is inserted through the hollow core 104 of the roll 102 until the end of the core 104 comes against the friction disk 116 on the fixed bracket 112. Then the removable bracket 120 is installed over the ends of the handle 110 and spindle 114, with its friction disk 126 presented toward the opposite end of the core 104.

The threaded end of the spindle 114 projects beyond the removable bracket 120 and through a coil-type compression spring 128 which bears against the bracket 120. Indeed, the spring 128 is compressed against the bracket 110 by a thumb nut 130 which threads over the end of the spindle 114 and compresses the spring 128. By reason of the force exerted by the spring 128, the two friction disks 116 and 126 bear snugly against the ends o the core 104 and create enough friction to prevent the roll 102 from turning freely on the spindle 114. Indeed, the torque or resistance imposed may be varied by turning the thumb nut 130 inwardly or outwardly on the end of the spindle 114.

To install the cover D on the elevated bale C, a short portion of the strip 100 is withdrawn from the roll 102, and the end is tucked beneath the retaining twine 2 near one end of the bale C. Indeed, the end of the strip 100 is gathered and actually tied to the twine 2. The withdrawn portion of the strip 100, that is the portion between the twine 2 and the dispenser E, is then stretched out and generally aligned with the end of the cylindrical surface for the bale, even though that surface does not terminate at a distinct end edge. With the strip 100 stretched reasonably taut between the bale C and the dispenser E, the power take off 6 for the tractor B is energized, and it turns the driven shaft 60 of the machine A (FIG. 1). The backing disk 42 and spear shaft 36, being connected to the driven shaft 60 through the chains 86, 90, the sprockets 40, 66, 86, 90, and the idler shaft 82, likewise rotate, but at a lesser velocity of about 15 to 20 rev/min, and of course the bale C turns about its cylindrical axis, inasmuch as the bale C is supported on the spear shaft 36 of the machine A and is engaged by the drive spikes 54 which impart the rotation of the disk 42 to it.

The rotating bale C withdraws the strip 100 from the roll 102, and as the strip 100 pays off of the roll 102, the individual charged with applying the cover D maneuvers the dispenser E so that the strip 100 winds spirally around the cylindrical surface on the bale C. This individual further adjusts the thumb nut 130 so that the torque exerted by the friction disks 116 and 126 on the roll 102 causes the strip 100 to stretch or elongate between about 40% and 60%. During the first revolution of the bale C, the dispenser E is positioned such that the strip projects somewhat beyond the end of the bale C. By reason of the stretch imposed on the strip 100, this outwardly projecting portion turns inwardly toward the axis of the bale C and creates a lip 132 at the periphery of the end face for the bale C. After the first revolution, the dispenser E is moved longitudinally along the bale C toward the opposite end as the bale C continues to rotate. This causes the strip C to wrap spirally around the cylindrical surface. The longitudinal advance of the dispenser E is such that about a 3 in. overlap exists at adjacent convolutions of the strip 100. The stretch imparted to the strip 100 as it is dispensed and the cling characteristics of the material cause adjacent convolutions to adhere and in effect seal to each other at the overlap. The stretch further causes the strip to conform to the contour of the bale C, yet enables the strip 100 to yield sufficiently at projecting hay straws to prevent those straws from poking through the strip 100. When the strip 100 reaches the opposite end of the bale C, the dispenser E is positioned such that the strip 100 projects beyond the end of the bale C for the last revolution. This produces an inwardly turned lip 132 at that end as well.

Upon completion of the last convolution, that is the one which turns inwardly to produce the lip 132 at the opposite end, the power take off 6 is stopped and the strip 100 is severed from the roll 102. The loose end that remains at the last convolution is tucked under the preceeding convolution so that it is not displaced by wind.

The strip 100 wound spirally around the cylindrical surface of the bale C constitutes the cover D (FIG. 1) which is in effect a protective sleeve formed about the bale C. Even though the cover D is not continuous in the sense that it is totally free of seams, the capacity of the strip 100 to adhere or cling to itself at the overlaps makes it for all intents and purposes waterproof in the region where it exists. Thus, rain or snow which falls upon the bale C will not enter the bale C through its cylindrical surface. Any moisture which comes in through the exposed end faces does not penetrate very deeply and evaporates in a short time. The cover D also prevents ground water from soaking into the bale C. In this regard, less air circulates in the region of the bale C that is against the ground, so it is desirable to keep this region of the bale C dry. The cover D serves that purpose. The inwardly turned lips 132 at the ends of the cover D divert runoff from the bale C, and prevent ground water from flowing into it.

Not only does the machine A apply covers D to bales C of hay, but it is also useful in spreading or unrolling the bales C in farm fields so that the hay is available to farm animals as fodder. To unroll a bale C, the drive spikes 54 are withdrawn from the outer sockets 48 and inserted into the inner sockets 50. With this minor alteration having been made, the tractor B and its three point hitch 4 are maneuvered to align the spear shaft 36 of the machine A, with the axis of the bale C. The spear shaft 36 is driven into the bale C, indeed far enough to cause the drive spikes 54 to enter the bale C as well.

Once the spear shaft 36 and drive spikes 54 are within the bale C, the elevating mechanism 12 for the three point hitch 4 is energized to lift the bale C off of the ground. Thereupon the cover D is cut off of or otherwise stripped from the bale C and the twine 2 is likewise removed. Then the tractor B is driven to the location where hay is to be spread, and at this location, the power take off 6 is energized to rotate the bale C. The stalks of hay spin from the bale C and fall onto the field where they will be consumed by the cattle.

The machine A in lieu of utilizing the power take off 6 as the source of power for rotating the bale C, may utilize a hydraulic motor which is connected to the hydraulic system of the tractor. In such a case the hydraulic motor could be connected through a chain to the sprocket 40 on the backing disk 42. Also, an electric clutch may be incorporated into the drive train of the machine A, with the clutch being controlled by a push button on the handle 110 of the dispense E. This enables a single person to place the cover D over the bale C.

A modified machine F (FIGS. 16-19) for holding and rotating a bale C so that a cover D may be applied to it, is in essence the machine A and the dispenser E united so that the operator need not hold the dispenser E as the strip 100 of film pays off of it onto the rotating bale C. The modified machine F includes the triangular frame 20 as well as the drive train commencing with the driven shaft 60 which connects to the drive shaft 14 of the power take off 6 and terminating with the backing disk 42 and drive spikes 54 which rotate with the spear shaft 36. In addition, the frame 20 of the machine F is fitted with a support 140 which suspends the dispenser E along one side of the bale C.

The support 140 includes (FIG. 16) a lower post 142 which at its lower end is welded to the frame 20 at the bracket 28 where one of the oblique side members 26 merges with the base member 22. The post 142 extends upwardly to about the elevation of the clevis 30 and at its upper end is provided with a set screw 144 (FIG. 19). The lower post 142 supports an upper post 146 having a pilot rod 148 extended axially downwardly from it into the interior of the lower post 142. The set screw 144, when turned downwardly, bears against the pilot rod 148 of the upper post 146 and prevents the upper post 146 from rotating with respect to the lower post 142. The upper post 146 projects upwardly, forming an extension of the lower post 142, and will rise above the upper surface of a typical bale C when the bale C is impaled on the spear shaft 36. At its upper end the upper post 146 is fitted with an arm 150 which projects laterally and curves somewhat downwardly, and of course the angular position of the arm 150 may be fixed by turning the set screw 144 down against the pilot rod 148. At its outer end the arm 150 is provided with a bushing 152 (FIG. 17), the axis of which is vertical, and the bushing 152 likewise possesses a set screw 154.

The arm 150 at its bushing 132 carries a track 154 which resembles an inverted channel, but has inwardly directed flanges along its lower edges (FIG. 18). Intermediate its ends, the track 156 is fitted with a pintle 158 (FIG. 17) which extends upwardly from the back wall of the track 156 and projects into the bushing 152 of the arm 150, it being retained in the bushing by a washer and transverse pin that lie over the bushing 152. The bushing 152 and the pintle 158 permit the track 156 to turn relative to the arm 150, but only when the set screw 154 is backed off. Thus, by turning the upper post 146 relative to the lower post 142 and rotating the track 156 relative to its supporting arm 150, the spacing between the track 156 and the bale C may be adjusted while still keeping the track 156 parallel to the spear shaft 36. When the set screws 144 and 154 are turned down, the track 156 remains in the position to which it is adjusted.

The track 156 provides a runway for a carriage 160 which supports the dispenser E, enabling the dispenser E to move along the track parallel to the spear shaft 36, yet spaced from the cylindrical surface of the bale C. The carriage 160 includes trolleys 162 (FIGS. 17 & 18) which are contained within the track 156 and roll along the inwardly directed flanges at its lower edge. In addition, the carriage 160 has a frame 164 which is connected to the trolleys 162 and indeed is suspended from them below the track 156. The frame 164 in turn supports a guide tube 166 which is connected to the frame 164 by hooks 168 so that the tube 166 can to a limited measure swing toward and away from the bale C. The tube 166 loosely receives rod-like handle 110 on the dispenser E, yet is somewhat shorter than the handle 110. Thus, dispenser E, with its roll 102 of strip 100, is suspended from the carriage 160 which is in turn suspended from the track 156.

The carriage 160 moves along the track 156 parallel to the axis of rotation for the bale C and the handle 110 of the dispenser moves along the guide tube 166, likewise parallel to the axis of rotation. Between the translation along the track 156 and the translation along the guide tube 166, the dispenser E can move from one end of the bale C to the other. Indeed, the translation is enough to enable the roll 102 on the dispenser to project slightly beyond each end of the bale C.

To place a cover D on the bale using the modified machine F, the spear shaft 36 is inserted in the bale C and the frame 20 is raised to elevate the bale C. Then with the set screws 144 and 154 of the support 140 backed off, the track 156 is moved to a position about 12 in. from the cylindrical surface of the bale C, yet parallel to the spear shaft 36. Once the track 156 is properly positioned, the carriage 160 is moved to one end of the track 156 and the handle 110 of the dispenser E may be shifted to one end of the guide tube 166, all to bring the end of the film roll 102 slightly beyond the end of the bale C. With the thumb nut 130 adjusted to provide the proper tension on the strip 100, the strip 100 is withdrawn from the roll 102 and attached to the bale C as previously described. Thereupon the power take off 6 for the tractor B is energized to rotate the bale C. The rotating bale C withdraws the strip 100 from the roll 102, and as the strip 100 pays off of the roll 102 the dispenser E is moved manually along the track 156 so that the strip 100 spirals about the bale C. Indeed, the speed of the advancement is such that successive convolutions of the strip overlap. The advancement ends at the opposite end of the bale C, and after the final convolution of strip 100 is in place, the power take off 6 is deenergized. The strip 100 is then cut and attached to the bale C, and of course the spear shaft 36 is withdrawn from the bale C.

This invention is intended to cover all changes and modifications of the example of the invention herein chosen for purposes of the disclosure which do not constitute departures from the spirit and scope of the invention.

What is claimed is:

1. An apparatus for use in connection with a transport vehicle for applying a cover to a round bale of hay, said apparatus comprising: a frame configured to be attached to the transport vehicle; a spear shaft carried by and projecting from the frame far enough to project axially a substantial distance into the bale; turning means carried by the frame for imparting rotation to the bale when the bale is on the spear shaft; a track supported on the frame generally parallel to the spear shaft; a carriage movable along the track; a dispenser attached to the carriage such that it can translate to and fro relative to the carriage in a direction parallel to the track, the length of the dispenser being substantially less than the axial dimension of the bale on the spear shaft, the length of the track and the translation of the dispenser relative the carriage that is on the track being of a magnitude great enough to enable the dispenser to project beyond each end of the bale on the spear shaft; and a roll of flexible strip material held by the dispenser such that the roll can rotate to enable the strip material to pay off of it and wrap around the bale as the turning means rotates the bale, the flexible strip material having a width substantially less than the axial dimension of the bale.

2. An apparatus for use in connection with a transport vehicle for applying a cover to a round bale of hay, said apparatus comprising: a frame configured to be attached to the transport vehicle; a spear shaft mounted generally horizontally at one end on the frame such that it projects beyond the frame and away from the transport vehicle to which the frame is attached, the opposite end of the shaft being unobstructed and pointed so that the shaft may be forced into a round bale of hay generally along the center axis of the bale; a backing member located at that end of the spear shaft where the spear shaft is mounted on the frame, the backing member being rotatable about the axis of the spear shaft; drive spikes attached to the backing member outwardly from the spear shaft and projecting beyond the backing member in generally the same direction as the spear shaft; means for rotating the backing member so that a rounded bale of hay which is impaled on it and on the drive spikes will likewise rotate about its center axis; a track mounted on the frame generally parallel to the spear shaft, but being spaced from the spear shaft a distance greater that the radius of the round bale; a carriage on the track for movement along the track; a dispenser; means for suspending the dispenser from the carriage such that the dispenser can shift relative to the carriage generally parallel to the track, the length of the track and the distance the dispenser can shift relative to the carriage being of a magnitude great enough to enable the dispenser to project beyond both ends of the bale; and a roll of flexible strip material mounted on the dispenser for rotation relative to the dispenser about an axis that is offset from the track, the strip material having a width that is substantially less than the axial dimensions of the spear shaft and the bale, whereby when the end of the strip material is attached to the bale and the bale rotates, the strip material pays off the roll and winds around the bale, and by moving the carriage along the track, successive convolutions are wound about the bale for the full length of the bale.

3. The apparatus according to claim 2 wherein the spear shaft rotates with and at the same angular velocity as the backing member.

* * * * *